March 7, 1967 — R. A. BILBREY — 3,307,394
ACCELERATION RESPONSIVE DEVICE
Filed Oct. 16, 1963

Inventor
Robert A. Bilbrey
By Anderson, Luedeka, Fitch, Even & Tabin
Att'ys

United States Patent Office 3,307,394
Patented Mar. 7, 1967

3,307,394
ACCELERATION RESPONSIVE DEVICE
Robert A. Bilbrey, Kensington, Calif., assignor to Benjamin W. West, doing business as California Controls Company, Oakland, Calif.
Filed Oct. 16, 1963, Ser. No. 316,560
4 Claims. (Cl. 73—71)

This invention relates to vibration or acceleration responsive devices. The invention is particularly adaptable for detecting the excessive vibration of a piece of equipment, and can be utilized with accompanying valves or switches to terminate or modify the operation of said equipment.

In use, the device may be secured to or otherwise connected to a part of the equipment to be protected or controlled so that the vibratory or accelerative forces developed by the equipment will be transmitted to the device in such manner as to communicate a similar movement to a movable member, for example, a rocker mounted on the device.

The rocker may be normally held in an inactive or quiescent position on the structure by a static force which tends to hold the rocker in its idle normal set position against any opposing force which may tend to shift the rocker. However, when a dynamic force due to vibration or accelerative force reaches a certain value, it will overcome the effect of the normal static holding force and the rocker will be projected away from its position of rest so as to engage an element which actuates a switch or valve for controlling the motive power of the equipment so as to reduce its speed or shut it down altogether.

The principal object of the invention is to provide a device which can be installed on or in connection with a piece of operating equipment in a simple manner, which device can be manufactured at reasonable cost and will operate with minimum danger of malfunctioning over long periods of time without loss of efficiency or requiring the replacement or repair of operating parts.

A further object of the invention is to provide a sensing means for actuating a device which is capable of being operated either electrically or by means of fluid pressure.

A further object of the present invention is the provision of an improved acceleration responsive device which is responsive over a wide range of vibratory frequencies and values in a predetermined and repeatable manner.

A further object of the invention is to provide an improved acceleration responsive device which is adaptable for actuation of electrical switches, valves, sounding devices and the like.

A further object of the invention is to provide an arrangement in which the tripping or release of the actuating mechanism does not occur until a definite prescribed and predetermined amplitude of displacement is obtained whereupon the mechanism will promptly shift or snap over into a safety position and will be held in such position without hunting or chattering, regardless of the reduction of the speed of operation of the equipment and the consequent reduction in the amplitude of the dynamic force which caused it to be tripped in the first place.

One way of obtaining the various advantages before noted includes the use of a special spring system for controlling the movement of a relatively high-inertia rocker-element so that improper tripping action will not occur until after a predetermined degree of dynamic displacement occurs, which is sufficient to overcome the normal "positive" holding torque of the spring element, whereupon the torque holding the rocker in its set position will be rapidly reduced so as to permit further movement of the rocker, and after a relatively short amount of movement has occurred, the reduction in the holding effect will be so large that the control element will snap over promptly into its active or control position. Thereupon, it will be held firmly in such tripped position without the help of the dynamic force.

Spring systems of various types can be used, provided that the holding spring has a resistance-to-deflection ratio which decreases as the rocker moves from its "set" to its tripped position.

A holding spring which has been found well suited to these requirements includes what, in the machinery supply trade, is known as a Belleville spring washer and is described in "McGraw-Hill Encyclopedia of Science and Technology," vol. 13, page 17, and by Almen and Laszlo in their article published in "Transactions of the American Institute of Mechanical Engineers," April, 1936, vol. 58, No. 4, pages 305–314. This is a washer made of spring metal, and instead of being completely flat, is dished slightly so that when the washer is loaded sufficiently to flatten it to a predetermined point, its resistance to further compression will be reduced. That is to say, the load-deflection ratio of the holding spring system will not be constant, but will be reduced as the deflection increases.

The selected embodiment herein illustrated by way of example, preferably includes a separate spring or other force for urging the rocker into its tripped or active position.

In the drawings forming a part of this specification and accompanying this description, and which illustrates a preferred embodiment of the invention, FIGURE 1 is a vertical section taken through the device;

Figure 1:
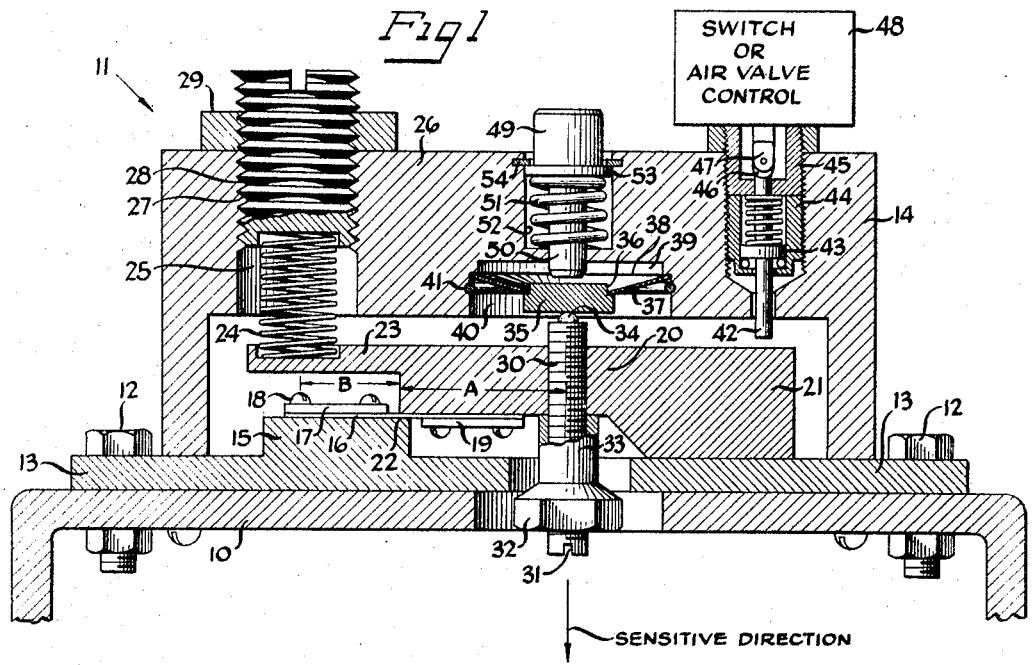
Figure 2:
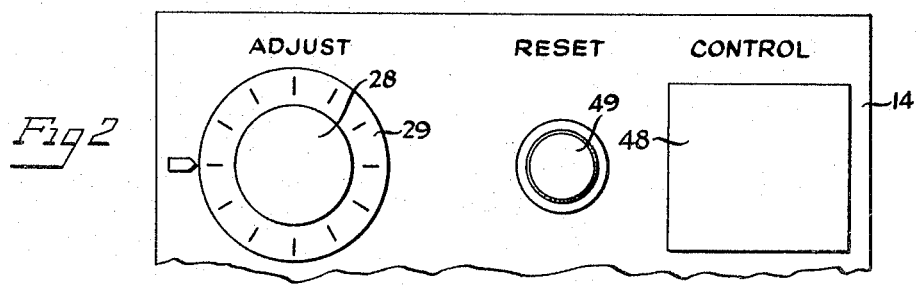
FIGURE 2 is a plan view of the device shown in FIGURE 1.

In the drawings, the element 10 is the frame of a rotating machine or other equipment to which the sensing structure 11 is preferably rigidly connected by means of bolts or screws 12 which extend through the bottom flange 13 of the sensing structure. The sensing structure also includes a closed box or casing 14 which houses the moving parts of the device.

On the upper face of the base plate 13 there is formed a rectangular boss 15, the top face of which is planed off to accommodate the rear end of a pivot in the form of a leaf spring 16 which is held in position by a small plate or clamp 17 with screws 18 extending into the boss 15. To the top face of the free end of the leaf spring 16 there is secured, by means of another clamping plate 19, a rocker element 20, which is formed with an integral head 21, the underside of which rests on the top face of the base plate 13. The left hand end of the rocker element 20 is extended beyond the left hand of the pivotal point 22 of the fulcrum of the pivot spring 16 to form a tail 23 in the end of which there is a circular recess forming a seat for a multi-turn open-coil wire biasing compression spring 24 which has a fairly large diameter, so that the spring 24, when properly adjusted for the particular case involved, may be compressed to about one-half of its normal unstressed length. In this way, the negative bias torque exerted by the spring 24 on arm 23 is substantially constant (see FIGURE 3) within the working range of the rocker.

Said multi-turn spring 24 extends into an axially vertical cylindrical bore 25 extending up through the top cover 26 of the casing 14. The cylindrical bore 25 is threaded as shown at 27, to receive an adjusting screw 28 having in its lower end, a circular recess which receives the top coil of the compression spring 24. The extent of compression of said bias spring 24 can be adjusted by screwing the threaded plug 28 in or out of the threaded cylindrical bore 25 and it may be locked into its proper position of adjustment by means of a lock nut 29.

At about the middle of the inertia member or rocker 20 there is bored an axially vertical hole which is threaded to receive an adjusting screw 30 which is vertically adjustable, such adjustment being effected by means of a slot 31 on the lower end of said screw 30. The screw 30 may be held in its adjusted position by means of a lock-nut 32, the upper end of which is provided with a shank or nipple 33 having threaded engagement with the screw 30.

The upper end of the adjusting screw 30 is made with an integral bead or button 34 which engages the lower face of a circular block 35, the upper end of which is formed with a rabbit 36. Said rabbit 36 is of the proper internal diameter to loosely receive the inside diameter of a Belleville washer 37, to which reference has previously been made. The fit of the grooved element 35 within the aperture of the washer 37 is sufficiently loose so that it will not interfere with the proper operation of the Belleville washer as the latter moves in an axially vertical direction. The outer edge of the Belleville washer 37 engages the lower face of the edge 38 of a shallow circular recess 39 at the upper end of a cylindrical cavity 40 in the underside of the cover piece 26. Preferably, the internal diameter of said recess 40 is large enough so that the outer circumference of the spring washer 37 will have a relatively loose fit within the cavity 40, and its special action will not be interfered with. If desired, the Belleville washer may be retained in said cavity 40 by means of a split retaining wire ring 41.

In the position of rest the washer 37 is partly compressed. In this position, when pressure is applied to the underside of the hub 35 of the washer 37 by means of the screw 30, the center of the washer will move upwardly under a gradually increasing resistance until it finally reaches a position where the resistance ceases to increase. As the compressive movement is continued, the resistance decreases rather rapidly at which point the screw 30 may be locked. In this "set" position, the torque holding the rocker down in its set or inactive position is a resultant downward or positive torque, the value of which positive holding torque is obtained by adding the positive torque exerted by the spring washer 37, to the lesser negative torque exerted by spring 24. See FIGURE 3. The torque effect of the pivot spring 15 is so small that it may be ignored.

In the specific example herein described and illustrated, the Belleville spring washer is made of spring steel having a thickness of about .012". The exterior diameter is 1¼" and the hole diameter is ½", with a free height of about .033", and a load of about 6 lbs. in the flat position.

Figure 3:
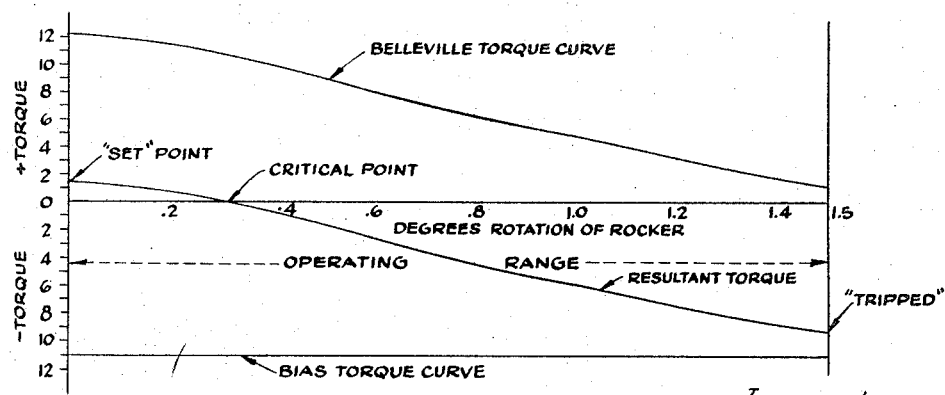
FIGURE 3 is a diagram showing the forces which are brought to bear upon the rocker element by the spring system.

As shown by the diagram, FIGURE 3, the positive torque of the Belleville washer is about 12½ units in the set position, as compared with a negative biasing torque of about 11 units, giving a resultant positive holding torque of 1½ units.

However, when the negative dynamic torque due to excessive vibration of the rocker reaches an amount sufficient to raise the rocker through an angle of about .3 degree (see FIGURE 3), the Belleville spring washer will have been compressed upwardly to the critical point point where the resultant torque curve is at a zero value, and any further increase in the dynamic torque will cause the resultant torque to become increasingly negative. As a result, the upward movement of the rocker will be accelerated and the rocker will snap up into the tripped position as indicated in FIGURE 3. In the tripped position the rocker will be held immovable by the relatively high negative torque of about 10 units.

When the rocker 20 snaps upwardly into its tripped position the upper face of its head 20 will engage the lower end of a stem 42 extending down from a head or piston 43 adapted to slide in the central bore of a threaded adjustable cylindrical plug 44 screwed into an axially vertical recess extending from the upper face of the cover member 26. Said cylindrical sleeve or thimble 44 is locked in its lowest position by means of a threaded plug 45 which receives an axially vertical pin 46 extending upwardly from the head 43 of the plunger 42. The pin 46 is connected to the lower end of a trigger pin 47 extending through the bottom of box 48 which contains a conventional controlling element, such as an electric switch or an air valve, serving to energize or activate a conventional means for automatically stopping or reducing the speed of the motor or other driving element of the machine which has run away or is out of proper control.

To restore the device to its idle or inactive rest position, the operator of the machine, after the proper repairs have been effected, presses downwardly upon the button 49. This button has on its lower end, an integral stem 50 which is normally held with its lower end slightly above the top of the roof of the recess 39. This is effected by means of a coiled compression spring 51 housed within the cylindrical bore 52 and with its upper turn engaging against a small flange or washer 53 underlying the head of the push button 49. Said washer 53 is retained in the bore 52 by means of a conventional split ring 54.

The device, as disclosed herein, is generally employed as a safety device for shutting down a machine which has developed a defect which causes a vibratory displacement. However, it may be used for reducing the operating speed to a desired predetermined value.

A patent is solicited for any and all herein disclosed patentable subject matter invented by applicant.

The embodiment disclosed herein may be changed or modified without departing from the scope of the invention.

Various features now believed to be new and patentable are set forth in the appended claims.

What is claimed is:

1. A device for automatically detecting or measuring a dynamic force generated by the operation of a piece of equipment and for controlling such operation, such device comprising
   A. a base structure for connection to said machine so as to mechanically respond to a dynamic force generated by said machine,
   B. an element for controlling the operation of said machine,
       (1) said element being normally inactive but being adapted to be activated so as to stop or modify said operation,
   C. a rocker pivoted on said structure for movement between a first position of repose and a second position in which it engages and activates the control element,
   D. first spring means urging said rocker toward said second position, and
   E. a second spring means having a fully deflected and a less than fully deflected condition,
       (1) said second spring means being positioned relative to said rocker so as to be engaged by and preclude movement of said rocker from said first to said second position when said second spring means is in a less than fully deflected condition,
       (2) said second spring means being oriented relative to said rocker so that when in the fully deflected condition it permits movement of said rocker into said second position,
       (3) said second spring means being maintained in a region of operation in which it exhibits a decreasing resistance to deflection during deflection.

2. A device for automatically detecting or measuring a dynamic force generated by the operation of a piece of equipment and for controlling such operation, such device comprising
   A. a base structure for connection to said machine so as to mechanically respond to a dynamic force generated by said machine,
B. an element for controlling the operation of said machine,
 (1) said element being normally inactive but being adapted to be activated so as to stop or modify said operation,
C. a rocker pivoted on said structure for movement between a first position of repose and a second position in which it engages and activates the control element,
D. first spring means urging said rocker toward said second position,
E. second spring means retaining said rocker in said first position, but adapted to permit movement of said rocker toward said second position when deflected,
 (1) said second spring means being characterized by a region of operation in which it exhibits an increasing resistance to deflection during initial deflection and a region of operation in which it exhibits a decreasing resistance to deflection upon further deflection, and
F. means maintaining said second spring in said region of operation in which it exhibits a decreasing resistance to deflection during deflection so as to enable said spring means to instantaneously release the force maintaining said rocker in said first position in response to minimal pivotal movement of said rocker, thereby permitting said rocker to be moved to said second position by the force applied by said first spring means.

3. A device in accordance with claim 2 wherein said means maintaining said second spring means in said region of decreasing resistance to deflection is adjustable so that the condition of the spring means within said region can be varied.

4. A device in accordance with claim 2 wherein said second spring means comprises a Belleville washer.

References Cited by the Examiner
UNITED STATES PATENTS 2,860,865  11/1958  Gardner _____ 73—538 X
2,942,456   6/1960  Hardway _____ 73—71.2

RICHARD C. QUEISSER, *Primary Examiner.*

C. A. RUEHL, J. J. GILL, *Assistant Examiners.*